US012450998B2

(12) United States Patent
Gupta et al.

(10) Patent No.: US 12,450,998 B2
(45) Date of Patent: Oct. 21, 2025

(54) MONITORING AND DE-DUPLICATING ALARMS IN WIRELESS NETWORK

(71) Applicant: RAKUTEN MOBILE, INC., Tokyo (JP)

(72) Inventors: Hemant Gupta, MP (IN); Nimit Agrawal, MP (IN); Abhishek Kumar Mishra, MP (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/041,932

(22) PCT Filed: Dec. 27, 2022

(86) PCT No.: PCT/US2022/054051

§ 371 (c)(1),
(2) Date: Feb. 16, 2023

(87) PCT Pub. No.: WO2024/107211

PCT Pub. Date: May 23, 2024

(65) Prior Publication Data

US 2024/0312335 A1 Sep. 19, 2024

(30) Foreign Application Priority Data

Nov. 14, 2022 (IN) ............................. 202241065057

(51) Int. Cl.
*G08B 25/00* (2006.01)
*G08B 25/10* (2006.01)
*G08B 29/18* (2006.01)

(52) U.S. Cl.
CPC ........... *G08B 25/001* (2013.01); *G08B 25/10* (2013.01); *G08B 29/185* (2013.01)

(58) Field of Classification Search
CPC .... G08B 25/001; G08B 25/10; G08B 29/185; G06F 11/07
See application file for complete search history.

(56) References Cited

U.S. PATENT DOCUMENTS 6,687,748 B1 * 2/2004 Zhang ................ H04L 41/0686 709/224
7,301,448 B1 11/2007 Usery et al.
(Continued)

FOREIGN PATENT DOCUMENTS

CN 115061841 A 9/2022

OTHER PUBLICATIONS

International Search Report issued Apr. 12, 2023 in International Application No. PCT/US 22/54051.
(Continued)

*Primary Examiner* — Curtis J King
(74) *Attorney, Agent, or Firm* — Sughrue Mion, PLLC

(57) ABSTRACT

Embodiments herein disclose a method and alarm monitoring device (200) for alarm monitoring and de-duplicating alarms in a wireless network (100). The method comprises receiving a first alarm event (404) and second alarm events from a plurality of devices (100A-100N) in the wireless network. The method further comprises de-duplicating the second alarm events by merging the second alarm events with the first alarm event (404) based on a retrieved current status of the first alarm event (404) when the second alarm events are received within a predefined time period. The method further comprises inserting the second alarm events separately in a database based on the retrieved current status of the first alarm event (404) when the second alarm events are not received within the predefined time period.

8 Claims, 7 Drawing Sheets

(56) References Cited

U.S. PATENT DOCUMENTS

| | | | | |
|---|---|---|---|---|
| 8,213,923 | B1 * | 7/2012 | Lu | H04M 3/42178 455/418 |
| 10,153,966 | B1 * | 12/2018 | Trundle | H04L 41/0695 |
| 2004/0100375 | A1 * | 5/2004 | Tanguay | G08B 25/00 340/524 |
| 2010/0157812 | A1 | 6/2010 | Blocker et al. | |
| 2016/0245531 | A1 * | 8/2016 | Ronk | A47J 36/321 |
| 2017/0294112 | A1 * | 10/2017 | Kushnir | G08B 29/02 |
| 2018/0314801 | A1 * | 11/2018 | Janssen | G16H 40/63 |
| 2018/0315285 | A1 | 11/2018 | Janssen | |
| 2019/0013101 | A1 * | 1/2019 | Johnson | H04L 12/282 |
| 2019/0320945 | A1 * | 10/2019 | Johnson | G08B 21/0446 |
| 2019/0388011 | A1 * | 12/2019 | Johnson | A61B 5/1118 |
| 2021/0287543 | A1 * | 9/2021 | Karapantelakis | G08G 1/205 |

OTHER PUBLICATIONS

Written Opinion issued Apr. 12, 2023 in International Application No. PCT/US 22/54051.

* cited by examiner

MONITORING AND DE-DUPLICATING ALARMS IN WIRELESS NETWORK

CROSS REFERENCE TO RELATED APPLICATIONS

This application is a National Stage of International Application No. PCT/US2022/054051 filed on Dec. 27, 2022, claiming priority based on Indian Patent Application number 202241065057 filed on Nov. 14, 2022.

FIELD OF INVENTION

The embodiments herein relate to an alarm monitoring device, and more particularly relates to a method and the alarm monitoring device for alarm monitoring and de-duplicating alarms in a wireless network.

BACKGROUND OF THE INVENTION

Generally, when a fault occurs in devices, the devices will send notifications in a form of alarms to a server in a wireless network. Thus the server will receive multiple alarms from multiple devices and the multiple alarms are analyzed to take corrective action.

Hence there is a high demand for alarm monitoring and reducing number of alarms among the multiple alarms for analyzing in the wireless network.

The conventional methods for alarm monitoring, monitor and analyze the multiple alarms, which causes wastage of time and requires a lot of man-hours to achieve accuracy of the outcome.

The other conventional method for alarm monitoring, monitors the multiple alarms with multiple servers, which reduces productivity, and increases the usage of labor and operational costs. Further, there are chances of repeated or similar alarms among the multiple alarms. Hence analyzing the repeated or the similar alarms causes wastage of time and storage. Thus, the conventional methods do not have any process to reduce a number of alarms among the multiple alarms and manage a state of the alarms.

Thus, it is desired to address the above mentioned disadvantages or other shortcomings or at least provide a useful alternative.

OBJECT OF INVENTION

The principal object of the embodiments herein is to provide a method and an alarm monitoring device for alarm monitoring and de-duplicating alarms in a wireless network to increase speed in taking corrective action and reduce a number of alarms to monitor.

Another object of the embodiments herein is to de-duplicate second alarm events by merging the second alarm events with the first alarm event based on a retrieved current status of the first alarm and time period difference which reduces the number of alarms to monitor.

Another object of the embodiments herein is to insert the second alarm events separately in a database based on the retrieved current status of the first alarm and the time period difference which separate unique alarms to monitor and analyze.

SUMMARY

Accordingly, the embodiments herein disclose an alarm monitoring device for alarm monitoring and de-duplicating alarms in a wireless network. The alarm monitoring device includes: a memory and a processor communicatively coupled to the memory and configured to receive a first alarm event includes a first alarm configuration from at least one device from a plurality of devices in the wireless network. Further, the processor is configured to receive second alarm events includes a second alarm configuration from the at least one device from the plurality of devices and determine whether the second alarm is associated with the first alarm based on the first alarm configuration and the second alarm configuration. Further, the processor is configured to retrieve a current state of the first alarm event from a database when the second alarm is associated with the first alarm, and determine whether the second alarm is received within a predefined time period based on the retrieved current state of the first alarm event. Further, the processor is configured to de-duplicate the second alarm events by merging the second alarm events with the first alarm event based on the retrieved current status of the first alarm when the second alarm events are received within the predefined time period, and updating the retrieved current state of the first alarm event as the second alarm events in the database after merging the second alarm events with the first alarm event. Further, the processor is configured to insert the second alarm events separately in the database based on the retrieved current status of the first alarm when the second alarm events are not received within the predefined time period, and store the current status of the second alarm events corresponding to the inserted second alarm event in the database.

In an embodiment, the processor is configured to increase a count of the first alarm after merging the second alarm events with the first alarm event and store the count of the first alarm corresponding to the retrieved current status of the first alarm event.

Accordingly, the embodiments herein disclose a method for alarm monitoring and de-duplicating alarms in the wireless network. The method includes receiving the first alarm event includes the first alarm configuration from the at least one device from the plurality of devices in the wireless network. The method further includes receiving the second alarm events includes the second alarm configuration from the at least one device from the plurality of devices and determining whether the second alarm is associated with the first alarm based on the first alarm configuration and the second alarm configuration. The method further includes retrieving the current state of the first alarm event from the database when the second alarm is associated with the first alarm and determining whether the second alarm is received within the predefined time period based on the retrieved current state of the first alarm event. The method further includes de-duplicating the second alarm events by merging the second alarm events with the first alarm event based on the retrieved current status of the first alarm when the second alarm events are received within the predefined time period, and updating the retrieved current state of the first alarm event as the second alarm events in the database after merging the second alarm events with the first alarm. The method further includes inserting the second alarm events separately in the database based on the retrieved current status of the first alarm when the at least one second alarm event is not received within the predefined time period and storing the current status of the second alarm events corresponding to the inserted second alarm event in the database.

In an embodiment, the method includes increasing the count of the first alarm after merging the second alarm event with the first alarm event. The method further includes storing the count of the first alarm corresponding to the retrieved current status of the first alarm event.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
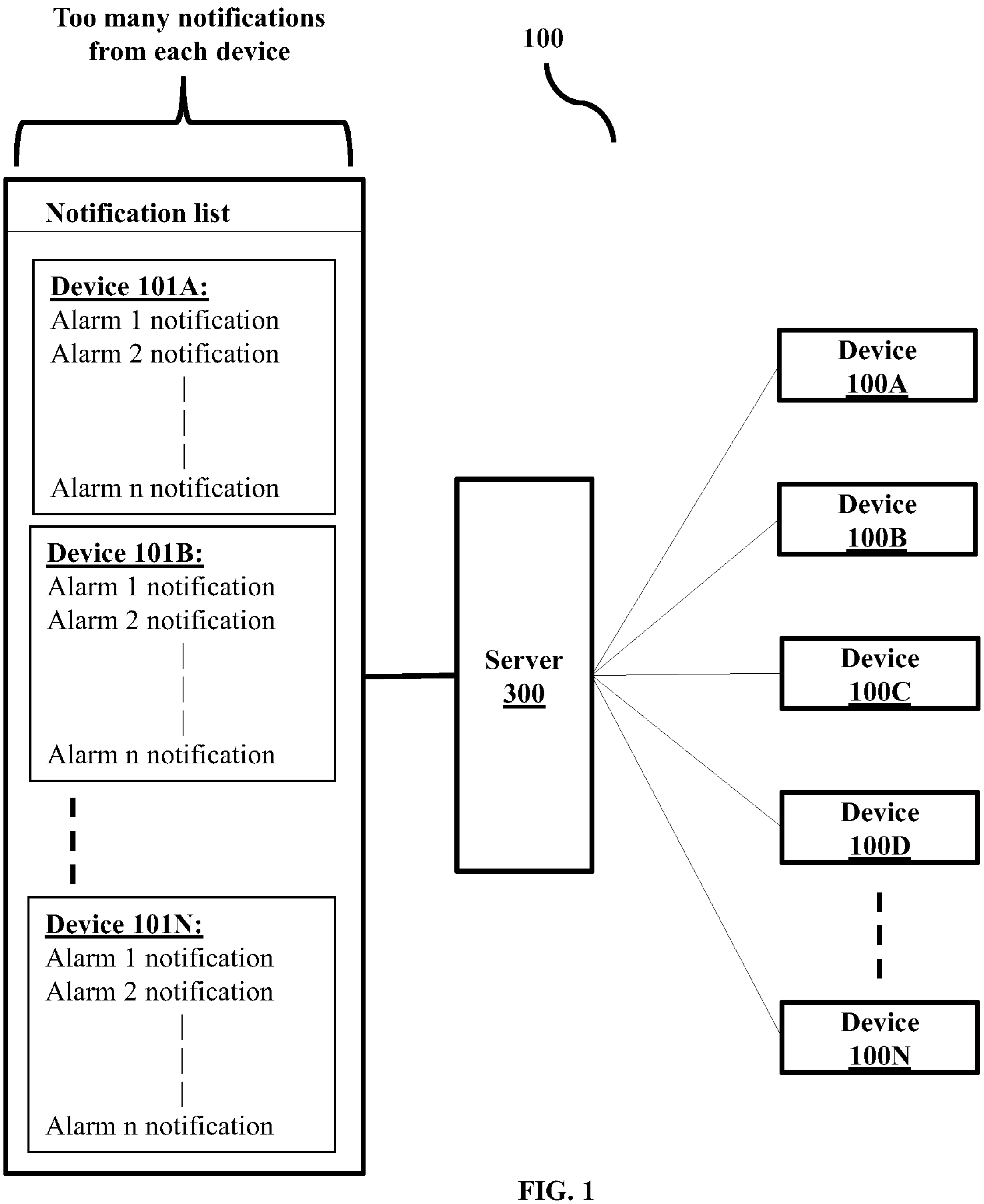
FIG. 1 (Prior art)
FIG. 1 is a schematic diagram illustrating a server receiving multiple alarms from devices, according to the prior arts.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose an alarm monitoring device for alarm monitoring and de-duplicating alarms in a wireless network. The alarm monitoring device includes: a memory and a processor communicatively coupled to the memory and configured to receive a first alarm event includes a first alarm configuration from at least one device from a plurality of devices in the wireless network. Further, the processor is configured to receive second alarm events includes a second alarm configuration from the at least one device from the plurality of devices and determine whether the second alarm is associated with the first alarm based on the first alarm configuration and the second alarm configuration. Further, the processor is configured to retrieve a current state of the first alarm event from a database when the second alarm is associated with the first alarm and determine whether the second alarm is received within a predefined time period based on the retrieved current state of the first alarm event. Further, the processor is configured to de-duplicate the second alarm events by merging the second alarm events with the first alarm event based on the retrieved current status of the first alarm when the second alarm events are received within the predefined time period, and update the retrieved current state of the first alarm event as the second alarm events in the database after merging the second alarm events with the first alarm event. Further, the processor is configured to insert the second alarm events separately in the database based on the retrieved current status of the first alarm when the second alarm events are not received within the predefined time period, and store the current status of the second alarm events corresponding to the inserted second alarm event in the database.

Accordingly, the embodiments herein disclose a method for alarm monitoring and de-duplicating alarms in the wireless network. The method includes receiving the first alarm event includes the first alarm configuration from the at least one device from the plurality of devices in the wireless network. The method further includes receiving the second alarm events includes the second alarm configuration from the at least one device from the plurality of devices and determining whether the second alarm is associated with the first alarm based on the first alarm configuration and the second alarm configuration. The method further includes retrieving the current state of the first alarm event from the database when the second alarm is associated with the first alarm and determining whether the second alarm is received within the predefined time period based on the retrieved current state of the first alarm event. The method further includes de-duplicating the second alarm events by merging the second alarm events with the first alarm event based on the retrieved current status of the first alarm when the second alarm events are received within the predefined time period, and updating the retrieved current state of the first alarm event as the second alarm events in the database after merging the second alarm events with the first alarm. The method further includes inserting the second alarm events separately in the database based on the retrieved current status of the first alarm when the at least one second alarm event is not received within the predefined time period and storing the current status of the second alarm events corresponding to the inserted second alarm event in the database.

FIG. 1 is a schematic diagram illustrating a server (300) receiving multiple alarms from devices (100A-100N), according to the prior arts.

Referring to FIG. 1, the server (300) receives multiple alarms from the devices (100A-100N) when a fault occurs. The server has too many notifications (101A-101N) for the multiple alarms from the devices (100A-100N) as shown in FIG. 1. The multiple alarms has to be analyzed to take corrective action. But analyzing too many notifications (101A-101N) causes wastage of time and requires a lot of man-hours to complete analyzing and achieving accuracy of the outcome.

In some other existing systems, multiple servers are needed to monitor the multiple alarms, which reduce productivity, and increase the usage of labor and operational costs.

In existing systems, there are chances for receiving repeated or similar alarms among the multiple alarms. Hence, analyzing repeated or similar alarms causes the wastage of time and wastage of storage.

Unlike existing systems, the proposed system can monitor and de-duplicate alarms in the wireless network for monitoring and analyzing. Thereby, reducing the monitoring and the analyzing time as the number of alarms are reduced.

Unlike existing systems, the proposed system de-duplicate alarms by merging the second alarm event with the first alarm event based on the retrieved current status of the first alarm when the second alarm event is received within the predefined time period which reduces frequent alarm counts.

Unlike existing systems, the proposed system inserts the second alarm event separately in the database based on the retrieved current status of the first alarm when the second alarm event is not received within the predefined time period.

Referring now to the drawings, and more particularly to FIG. 2 through FIG. 4K, where similar reference characters denote corresponding features consistently throughout the figure, these are shown preferred embodiments.

Figure 2:
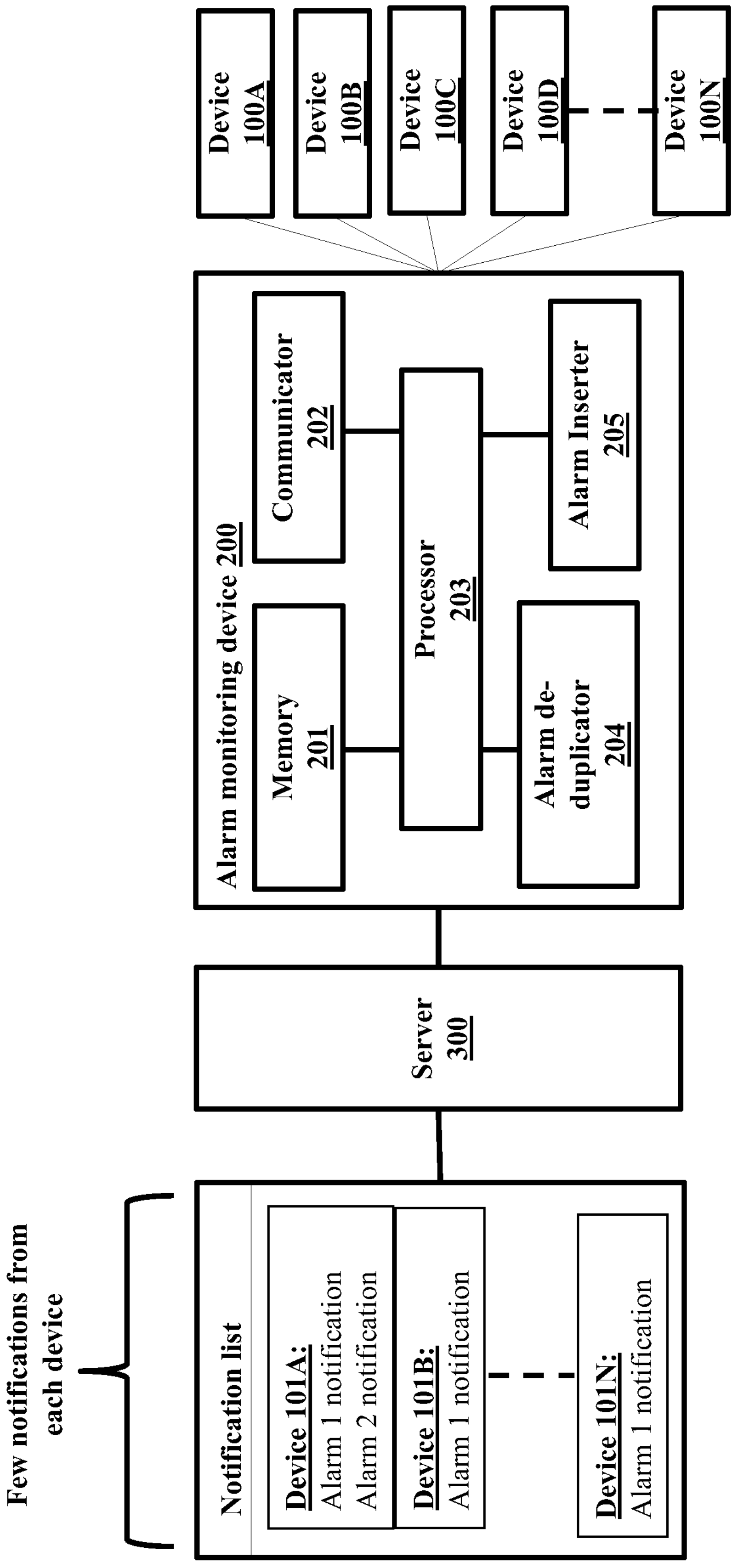
FIG. 2 is a schematic diagram illustrating an alarm monitoring device connected between the server and the devices, according to the embodiments as disclosed herein.

FIG. 2 is a schematic diagram illustrating an alarm monitoring device (200) connected in between a server (300) and a plurality of devices (100A-100N), according to the embodiments as disclosed herein.

The alarm monitoring device (200) receives alarms from the plurality of devices (100A-100N). The alarm monitoring device (200) monitors and de-duplicates alarms in the wireless network. The alarm monitoring device (200) shares the result of alarm monitoring and de-duplication to the server (300). Therefore, the server will have less number of notifications (101A-101N) from the plurality of devices (100A-100N) as the alarm monitoring device (200) de-duplicates alarms.

Referring to FIG. 2, examples of the alarm monitoring device (200) include, but are not limited to a laptop, a palmtop, a desktop, a mobile phone, a smartphone, Personal Digital Assistant (PDA), a tablet, a wearable device, an Internet of Things (IoT) device, server, a virtual reality device, a foldable device, a flexible device, an immersive system, etc.

In an embodiment, the alarm monitoring device (200) includes a memory (201), a processor (203), a communicator (202), an alarm de-duplicator (204) and an alarm inserter (205).

The memory (201) stores instructions for alarm de-duplication and alarm insertion to be executed by the processor (203). The memory (201) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (201) may, in some examples, be considered a non-transitory storage medium. The term "non-transitory" may indicate that the storage medium is not embodied in a carrier wave or a propagated signal. However, the term "non-transitory" should not be interpreted that the memory (201) is non-movable. In some examples, the memory (201) can be configured to store larger amounts of information than its storage space. In certain examples, a non-transitory storage medium may store data that can, over time, change (e.g., in Random Access Memory (RAM) or cache). The memory (201) can be an internal storage unit or it can be an external storage unit of the alarm monitoring device (200), a cloud storage, or any other type of external storage.

The processor (203) is configured to execute instructions stored in the memory (201). The processor (203) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (203) may include multiple cores to execute the instructions.

The communicator (202) is configured for communicating internally between hardware components in the alarm monitoring device (200). Further, the communicator (202) is configured to facilitate the communication between the alarm monitoring device (200) and other devices via one or more networks (e.g. Radio technology). The communicator (202) includes an electronic circuit specific to a standard that enables wired or wireless communication.

The processor (203) is coupled with other processors such as the alarm de-duplicator (204) and the alarm inserter (205) to perform the embodiment.

The processor (203), the alarm de-duplicator (204), and the alarm inserter (205) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The processor (203) is configured to receive a first alarm event includes a first alarm configuration from at least one device from a plurality of devices (100A-100N) in the wireless network. Further, the processor is configured to receive second alarm events includes a second alarm configuration from the at least one device from the plurality of devices (100A-100N) and determine whether the second alarm is associated with the first alarm based on the first alarm configuration and the second alarm configuration. Further, the processor is configured to retrieve a current state of the first alarm event from the database when the second alarm is associated with the first alarm and determine whether the second alarm is received within the predefined time period based on the retrieved current state of the first alarm event.

The alarm de-duplicator (204) de-duplicates the second alarm events by merging the second alarm events with the first alarm event based on the retrieved current status of the first alarm when the second alarm events are received within the predefined time period, and update the retrieved current state of the first alarm event as the second alarm events in the database after merging the second alarm events with the first alarm event.

The alarm inserter (205) inserts the second alarm events separately in the database based on the retrieved current status of the first alarm when the second alarm events are not received within the predefined time period, and stores a current status of the second alarm events corresponding to the inserted second alarm event in the database.

The processor (203) is configured to increase a count of the first alarm after merging the second alarm events with the first alarm event and store the count of the first alarm corresponding to the retrieved current status of the first alarm event.

The alarm de-duplicator (204) detects the retrieved current status of the first alarm event as active or closed when the second alarm events are received. The alarm de-duplicator (204) further detects an event time of the first alarm event and an event time of the second alarm events when the second alarm events are received while the current status of the first alarm event is active or closed. The alarm de-duplicator (204) further de-duplicates the second alarm events by merging the second alarm events with the first alarm event based on the event time of the first alarm event and the event time of the second alarm events.

The alarm de-duplicator (204) detects the retrieved current status of the first alarm event as active when the second alarm events are received. The alarm de-duplicator (204) further detects the event time of the second alarm events are prior to the event time of the first alarm event. The alarm de-duplicator (204) further de-duplicates the second alarm events by merging the second alarm events with the first alarm event and changing the event time of the first alarm event to the event time of the second alarm events.

The alarm inserter (205) detects the retrieved current status of the first alarm event as closed when the second alarm events are received and detects the event time of the first alarm event and the event time of the second alarm events when the second alarm events are received while the current status of the first alarm event is closed.

The alarm inserter (205) further inserts the second alarm events separately in the database based on the event time of the first alarm event and the event time of the second alarm events.

Figure 3:
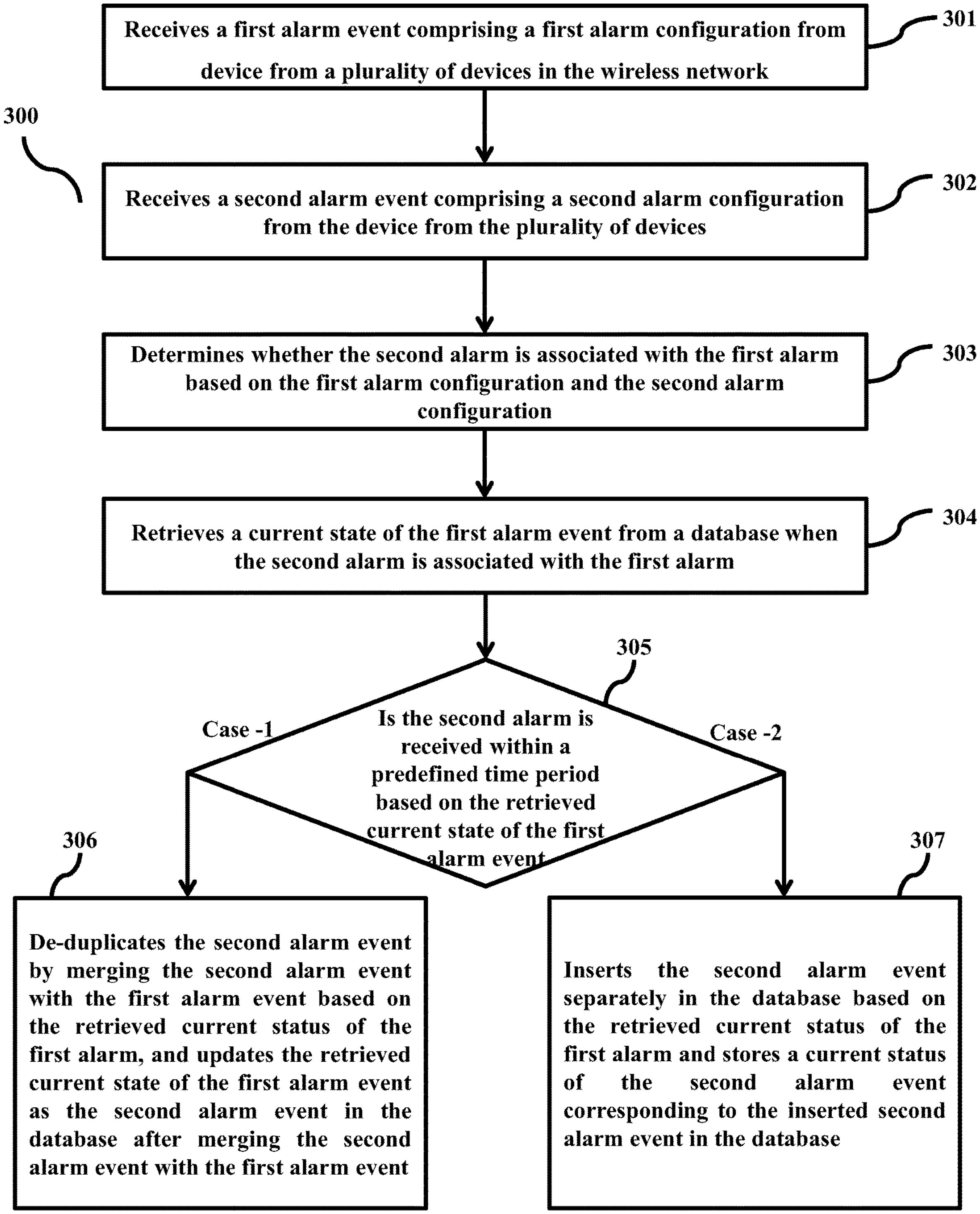
FIG. 3 is a flow diagram illustrating a method for alarm monitoring and de-duplicating alarms in a wireless network, according to the embodiments as disclosed herein.

FIG. 3 is a flow diagram (300) illustrating a method for alarm monitoring and de-duplicating the alarms in the wireless network (100), according to the embodiments as disclosed herein.

The steps 301 to step 307 of the flow diagram (300) are performed by the alarm monitoring device (200).

At step 301, the alarm monitoring device (200) receives the first alarm event includes the first alarm configuration from at least one device of the plurality of devices (100A-100N) in the wireless network (100).

At step 302, the alarm monitoring device (200) receives the second alarm event includes the second alarm configuration from the at least one device of the plurality of devices (100A-100N).

At step 303, the alarm monitoring device (200) determines whether the second alarm is associated with the first alarm based on the first alarm configuration and the second alarm configuration.

At step 304, the alarm monitoring device (200) retrieves the current state of the first alarm event from the database when the second alarm is associated with the first alarm.

At step 305, the alarm monitoring device (200) determines whether the second alarm is received within the predefined time period based on the retrieved current state of the first alarm event.

At step 306, the alarm monitoring device (200) de-duplicates the second alarm event by merging the second alarm event with the first alarm event based on the retrieved current status of the first alarm when the at least one second alarm event is received within the predefined time period, and updates the retrieved current state of the first alarm event as the second alarm event in the database after merging the second alarm event with the first alarm event At step 307, the alarm monitoring device (200) inserts the second alarm event separately in the database based on the retrieved current status of the first alarm and stores the current status of the second alarm event corresponding to the inserted second alarm event in the database when the at least one second alarm event is not received within the predefined time period.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4A:
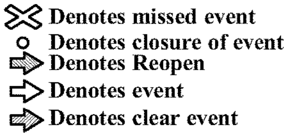
FIG. 4A is a schematic diagram illustrating merging of the alarms when the alarms are active, according to the embodiments as disclosed herein.
Figure 4A:
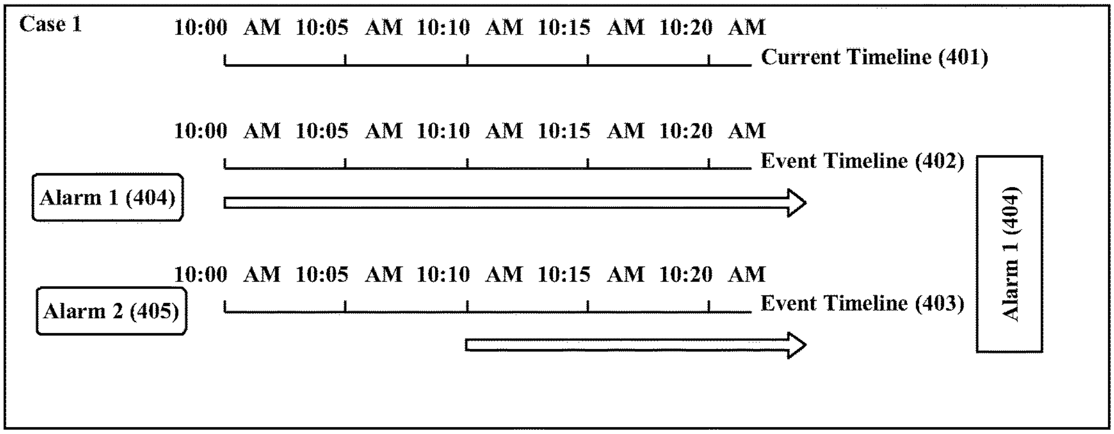

FIG. 4A is a schematic diagram illustrating the merging of the alarms when the alarms are active, according to the embodiments as disclosed herein.

Referring to FIG. 4A, the alarm monitoring device (200) receives the first alarm event includes the first alarm configuration from at least one device from a plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) determines the current state of the first alarm event (404) and second alarm event (405). A current timeline (401) is a timeline of the alarm monitoring device (200), an event timeline (402) is a timeline of a first alarm event (404) and an event timeline (403) is a timeline of a second alarm event (405).

The alarm monitoring device (200) further determines whether the second alarm is associated with the first alarm based on the first alarm configuration and the second alarm configuration. The alarm monitoring device (200) detects the current status of the first alarm event (404) as active when the second alarm event (405) is received. The alarm monitoring device (200) de-duplicates the second alarm event (405) by merging the second alarm event (405) with the first alarm event (404).

Figure 4B:
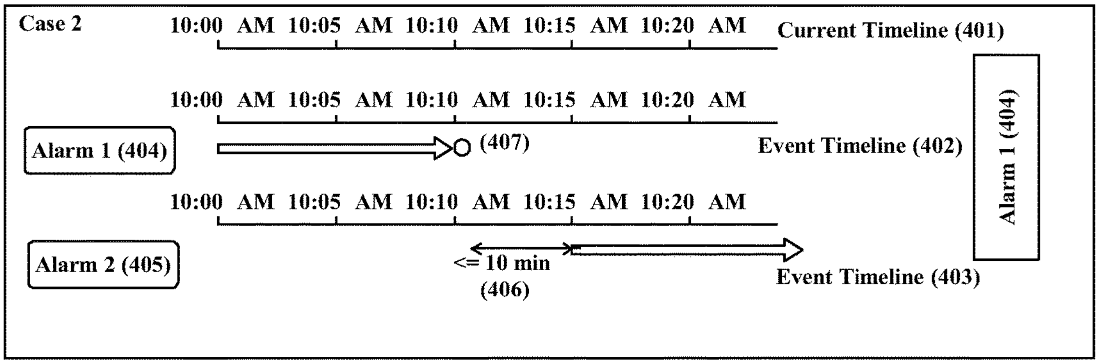
FIG. 4B is a schematic diagram illustrating the merging of the alarms when a second alarm event is received within a predefined time period, according to the embodiments as disclosed herein.

FIG. 4B is a schematic diagram illustrating the merging of the alarms when the second alarm event (405) is received within the predefined time period, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) determines when the second alarm event (405) is received within the predefined time period (e.g. within 10 minutes) (406) after the closure (407) of the first alarm event (404) as shown in the event timeline (402).

The alarm monitoring device (200) de-duplicates the second alarm event (405) by merging the second alarm event (405) with the first alarm event (404). The alarm monitoring device (200) updates the current state of the first alarm event (404) (i.e. closed) as the status of the second alarm event (405) (i.e. active) in the database after merging the second alarm event (405) with the first alarm event (404). Therefore, the status of the first alarm event will be active.

Figure 4C:
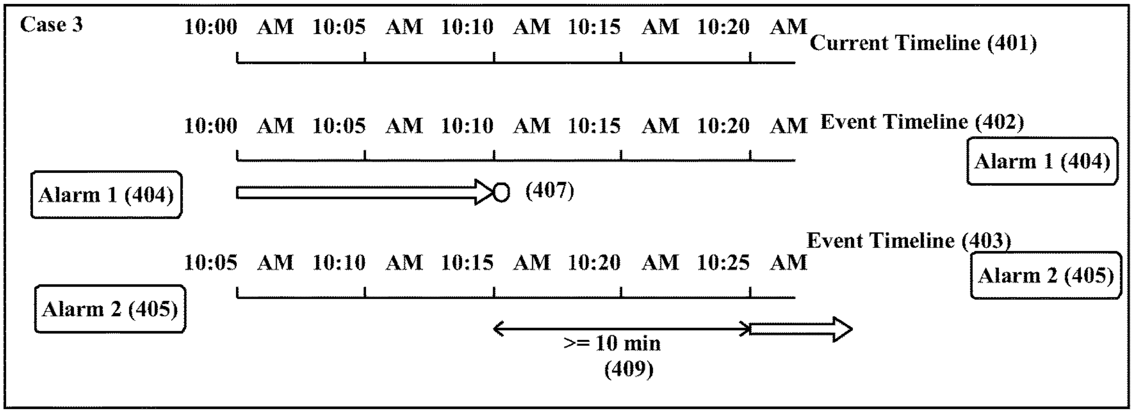
FIG. 4C is a schematic diagram illustrating inserting of the alarms when the second alarm event is not received within the predefined time period, according to the embodiments as disclosed herein.

FIG. 4C is a schematic diagram illustrating the inserting of alarms when the second alarm event (405) is not received within the predefined time period, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) determines the current state of the first alarm event (404) as closed (407).

The alarm monitoring device (200) inserts the second alarm event (405) separately in the database after determining the closure of the first alarm event (404) when the second alarm event (405) is not received within the predefined time period (e.g. not within 10 minutes) (409).

Figure 4D:
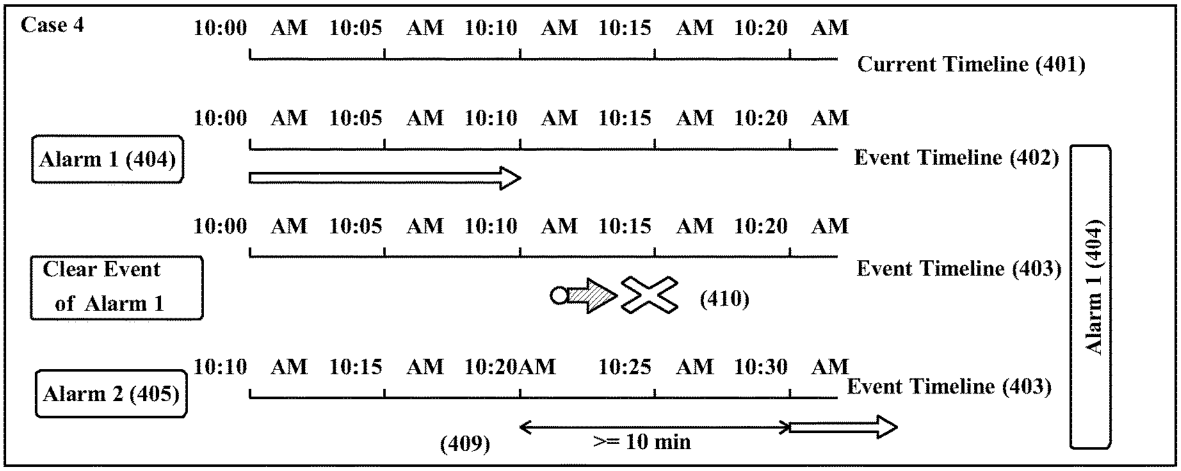
FIG. 4D is a schematic diagram illustrating the merging of the alarms when the alarm monitoring device is not aware with a closure of a first alarm, according to the embodiments as disclosed herein.

FIG. 4D is a schematic diagram illustrating the merging of alarms when the alarm monitoring device (200) is not aware with the closure of the first alarm event (404), according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receive the second alarm event (405) includes the second alarm configuration from the at least one device from the plurality of devices (100A-100N).

The alarm monitoring device (200) missed noticing the current status of the first alarm event (404) as closed when the second alarm event (405) is received. The alarm monitoring device (200) de-duplicates the second alarm event (405) by merging the second alarm event (405) with the first alarm event (404) when the second alarm event (405) is not received within the predefined time period (409) after the closure (410) of the first alarm event (404) when missed noticing the current status of the first alarm event (404) as closed.

The alarm monitoring device (200) updates the current state of the first alarm event (404) as the state of the second alarm event (405) in the database after merging the second alarm event (405) with the first alarm event (404).

Figure 4E:
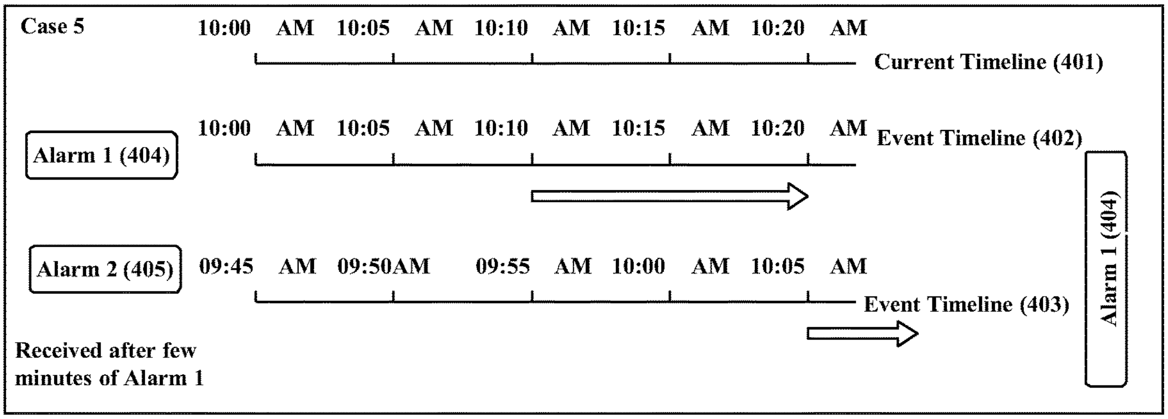
FIG. 4E is a schematic diagram illustrating the merging of the alarms when a difference between an event time of the first alarm event and an event time of the second alarm event is within the predefined time period, according to the embodiments as disclosed herein.

FIG. 4E is a schematic diagram illustrating the merging of alarms when a difference between the event time of the first alarm event (404) and the event time of the second alarm event (405) is within the predefined time period, according to the embodiments as disclosed herein.

The alarm monitoring device (200) receive the first alarm event includes the first alarm configuration from at least one device from the plurality of devices (100A-100N) in the wireless network (100). Further the alarm monitoring device (200) receive the second alarm event (405) includes the second alarm configuration from the at least one device from the plurality of devices (100A-100N). The alarm monitoring device (200) de-duplicates the second alarm event (405) by merging the second alarm event (405) with the first alarm event (404) when the time difference between the event time of the first alarm event (404) and the event time of the second alarm event (405) is within the predefined time period. Further, the alarm monitoring device (200) updates the event time of the first alarm event (404) with the event time of the second alarm event (405).

Referring to FIG. 4E the event time of the first alarm event (404) is 10.10 AM and the event time of the second alarm event (405) in the event timeline (405) is 10.05 AM, which is received at 10.20 AM. The alarm monitoring device (200) changes the event time of the first alarm event (404) to 10:05 from 10.10 AM as the difference between the event time of the first alarm event (404) and the event time of the second alarm event (405) is within the predefined time period (e.g. within 10 minutes).

Figure 4F:
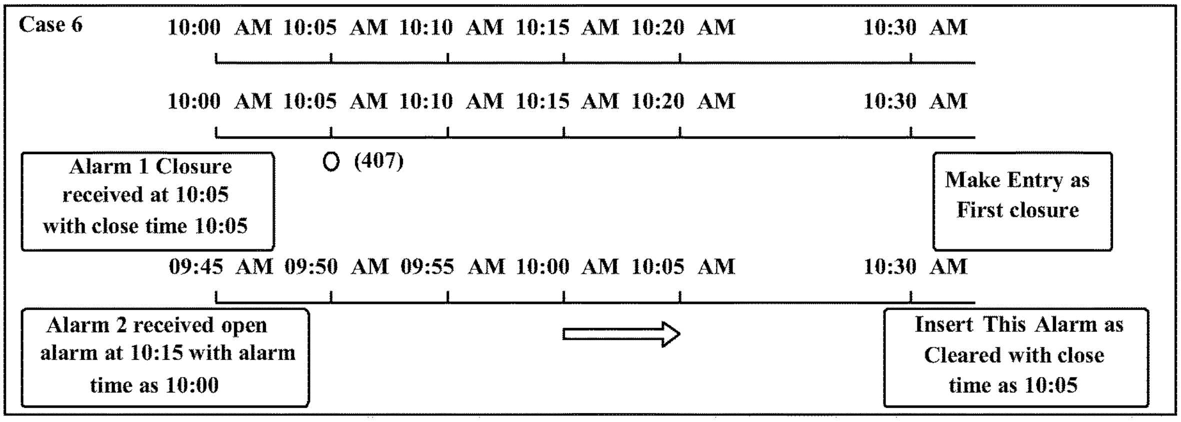
FIG. 4F is a schematic diagram illustrating the inserting of the alarms when a closed alarm is received before an active alarm, according to the embodiments as disclosed herein.

FIG. 4F is a schematic diagram illustrating the inserting of the alarms when the closed alarm is received before the active alarm, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) inserts the second alarm event (405) by closing the second alarm event (405) when the current status of the first alarm event (404) is closed.

Referring to FIG. 4F, the first alarm event (404) closed at time 10:05 (407) which was received before the active second alarm event (405). The second alarm event (405) received at 10:00 after a few minutes that alarm will be inserted as closed and the closed time will be 10:05.

Figure 4G:
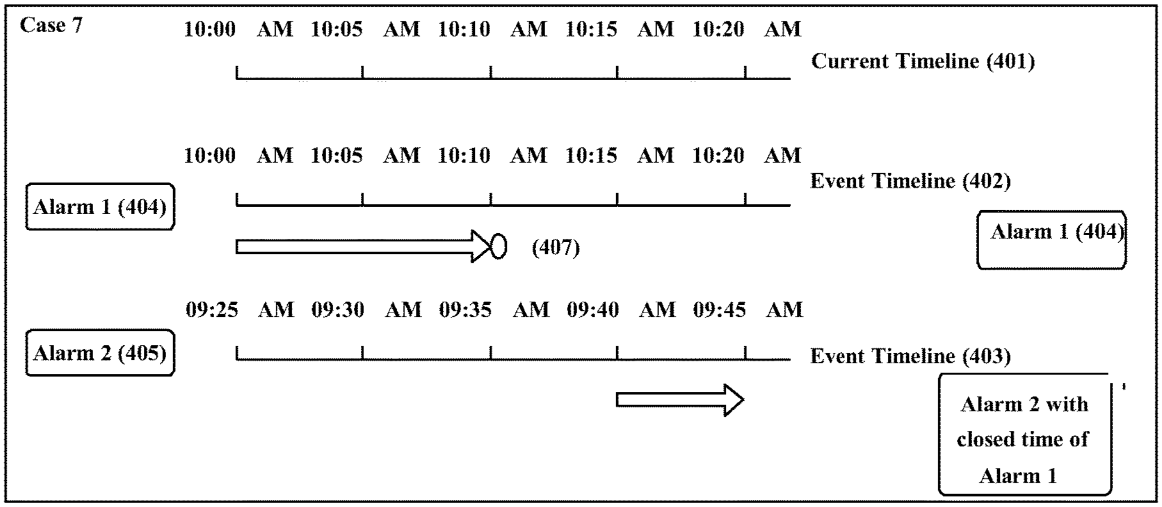
FIG. 4G is a schematic diagram illustrating ingesting of the alarms when the event time of the first alarm event and the event time of the second alarm event is not within the predefined time, according to the embodiments as disclosed herein.

FIG. 4G is a schematic diagram illustrating the ingesting of the alarms when the event time of the first alarm event (404) and the event time of the second alarm event (405) is not within the predefined time (409), according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) receives the first alarm event (404) at 10:00 AM with event time 10:00 and the first alarm event (404) is closed at 10:10 AM, after that the alarm monitoring device (200) receives the second alarm event (405) with event Time 09:40 (event timeline (403)) at 10:15 (current timeline (401)). In this case, the alarm monitoring device (200) will not de-duplicate the second alarm event (405) and ingest as a new closed alarm with a close time of 10:10 AM.

Figure 4H:
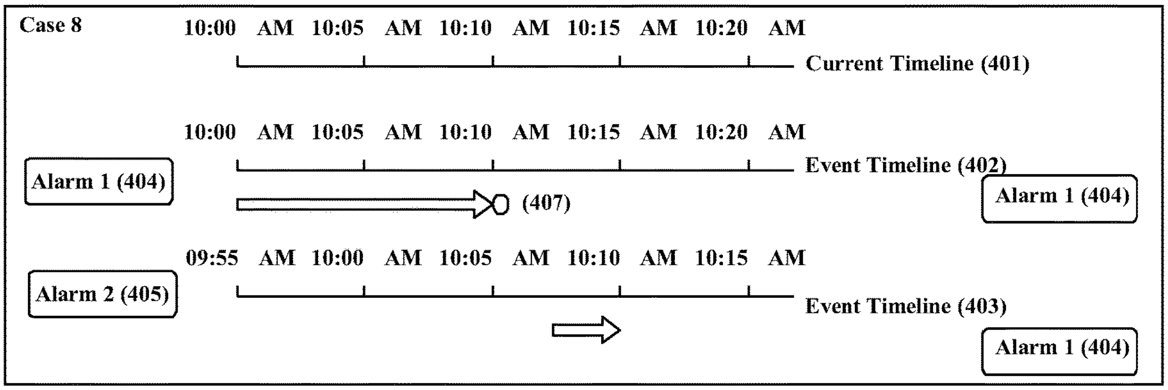
FIG. 4H is a schematic diagram illustrating the merging of the alarms when the event time of the first alarm event and the event time of the second alarm event is within the predefined time, according to the embodiments as disclosed herein.

FIG. 4H is a schematic diagram illustrating the merging of alarms when the event time of the first alarm event (404) and the event time of the second alarm event (405) is within the predefined time, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) receives the first alarm event (404) at 10:00 AM with event time 10:00 AM and then the first alarm event (404) is closed at 10:10 AM. After that the alarm monitoring device (200) receives the second alarm event (405) with event time 10:08 AM at 10:12 AM. The alarm monitoring device (200) de-duplicates by merging the second alarm event (405) with the first alarm event (404) and updates a last updated time and an occurrence count, and keeps the event time remain same.

Figure 4I:
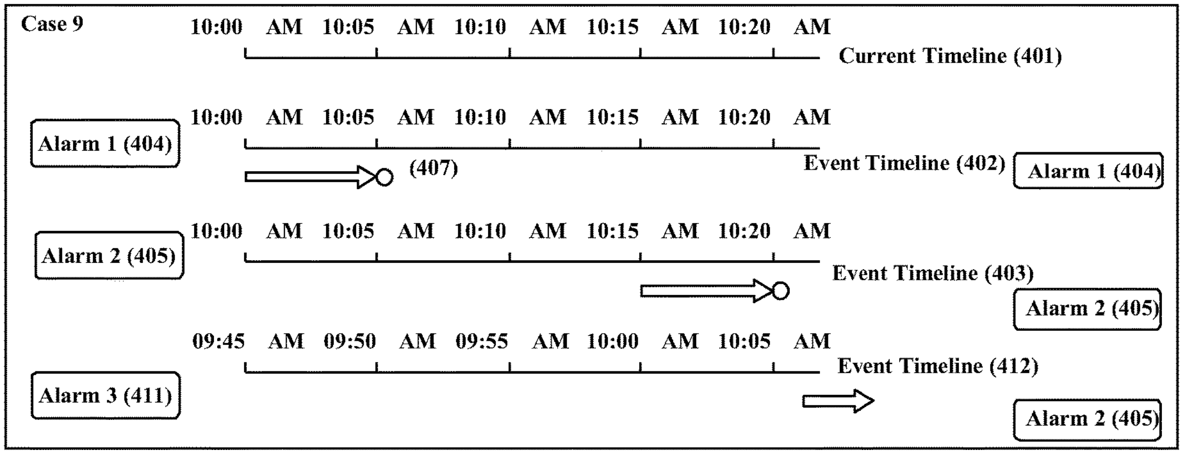
FIG. 4I is a schematic diagram illustrating the merging of the alarms when a third alarm is received within the predefined time period, according to the embodiments as disclosed herein.

FIG. 4I is a schematic diagram illustrating the merging of the alarms when a third alarm event (411) is received within the predefined time period, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). Further the alarm monitoring device (200) receives the third alarm event (411) includes the third alarm configuration from the at least one device from the plurality of devices (100A-100N).

The alarm monitoring device (200) receives the first alarm event (404) at 10:00 AM with event time 10:00 AM and the first alarm event (404) is closed at 10:05 AM. After that, the alarm monitoring device (200) receives the second alarm event (405) with event time 10:16 AM at 10:16 AM, and the second alarm event (405) closed at 10:20 AM. After that, the alarm monitoring device (200) receives the third alarm (411) at 10:22 AM with event time as 10:08 AM. In this case, the alarm monitoring device (200) will de-duplicate the third alarm (411) with the second alarm event (405) by merging as the difference between the second alarm event (405) and the third alarm (411) is less than 10 minutes.

Figure 4J:
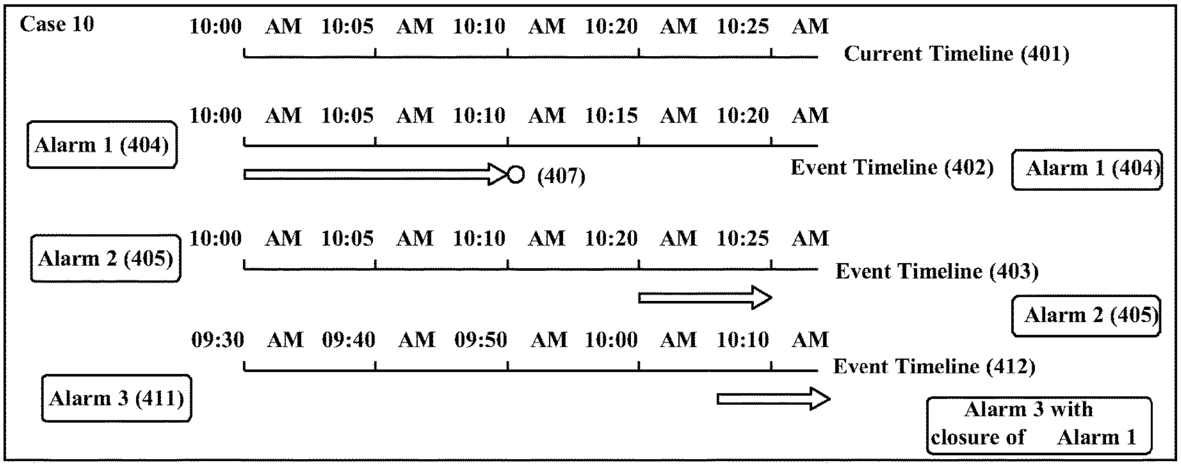
FIG. 4J is a schematic diagram illustrating the inserting of the alarms when the third alarm is not received within the predefined time period, according to the embodiments as disclosed herein.

FIG. 4J is a schematic diagram illustrating the inserting of alarms when the third alarm (411) is not received within the predefined time period, according to the embodiments as disclosed herein.

The alarm monitoring device (200) receives the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). Further the alarm monitoring device (200) receives the third alarm event (411) includes the third alarm configuration from the at least one device from the plurality of devices (100A-100N).

The alarm monitoring device (200) receives the first alarm event (404) at 10:00 AM with event time 10:00 AM and the first alarm event (404) closed at 10:10 AM. After that, the alarm monitoring device (200) receives the second alarm event (405) with event Time 10:21 AM at 10:21 AM. After that, the alarm monitoring device (200) receives the third alarm (411) at 10:24 AM with event time as 10:08 AM. In this case, the alarm monitoring device (200) ingests the third alarm (411) as a new closed alarm with a close time of first alarm event (404) at 10:10 AM.

Figure 4K:
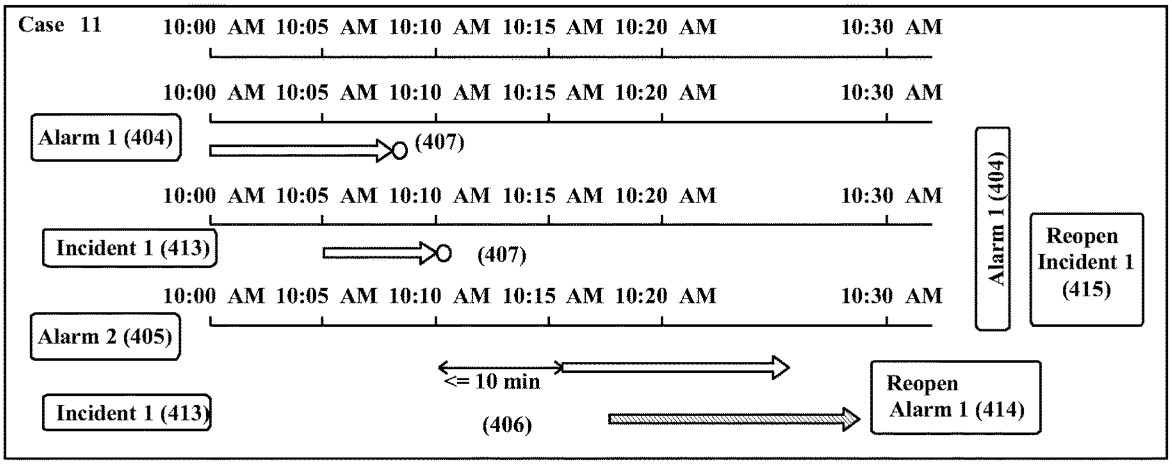
FIG. 4K is a schematic diagram illustrating reopening of the closed alarm, according to the embodiments as disclosed herein.

FIG. 4K is a schematic diagram illustrating a reopening of the closed alarm, according to the embodiments as disclosed herein.

The alarm monitoring device (200) receive the first alarm event includes the first alarm configuration from at least one device from the plurality of devices (100A-100N) in the wireless network (100). Further the alarm monitoring device (200) receives the second alarm event (405) includes the second alarm configuration from the at least one device from the plurality of devices (100A-100N). The alarm monitoring device (200) detects the current status of the first alarm event (404) as closed and a first incident (413) is closed. The alarm monitoring device (200) de-duplicates the second alarm event (405) by merging the second alarm event (405) with the first alarm event (404) when the second alarm event (405) is received within the predefined time period (e.g. within 10 minutes) (406). In this case, the alarm monitoring device (200) further updates the current status of the first alarm event (404) as reopen (414). Thus the alarm monitoring device (200) reopens the first alarm event (404) and also reopens the first incident (415).

Therefore, the proposed method includes the following advantages:

Monitoring operator will have a smaller number of alarms to monitor and analyze.

Provides benefits for threshold level alarms (time difference between similar alarms which are less) as it will receive frequently.

Reduce wastage of time as smaller number of alarms are to be monitored.

Reduces the usage of labor and operational costs due to the de-duplication of alarms.

De-duplication of the alarms improves time efficiency and reduces storage cost as repeated or similar alarms are de-duplicated.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. An alarm monitoring device for alarm monitoring and de-duplicating alarms in a wireless network, wherein the alarm monitoring device comprises:

a memory;

a processor, communicatively coupled to the memory, configured to:

receive a first alarm event comprising a first alarm configuration from at least one device from a plurality of devices in the wireless network;

receive at least one second alarm event comprising a second alarm configuration from the at least one device from the plurality of devices;

determine whether the second alarm event is associated with the first alarm event based on the first alarm configuration and the second alarm configuration;

retrieve a current state of the first alarm event from a database when the second alarm event is associated with the first alarm event;

determine whether the second alarm event is received within a predefined time period based on the retrieved current state of the first alarm event;

de-duplicate the at least one second alarm event by merging the at least one second alarm event with the first alarm event based on the retrieved current state of the first alarm event when the at least one second alarm event is received within the predefined time period, and update the retrieved current state of the first alarm event as a current state of the at least one second alarm event in the database after merging the at least one second alarm event with the first alarm event; and insert the at least one second alarm event separately in the database based on the retrieved current state of the first alarm event when the at least one second alarm event is not received within the predefined time period, and store the current state of the at least one second alarm event corresponding to the at least one inserted second alarm event in the database, wherein the processor is configured to merge the at least one second alarm event with the first alarm event by:

increasing a count of the first alarm event after merging the at least one second alarm event with the first alarm event; and storing the count of the first alarm event corresponding to the retrieved current state of the first alarm event.

2. The alarm monitoring device as claimed in claim 1, wherein the processor is further configured to merge the at least one second alarm event with the first alarm event based on the retrieved current state of the first alarm event by:

detecting the retrieved current state of the first alarm event as active or closed when the at least one second alarm event is received;

detecting an event time of the first alarm event and an event time of the at least one second alarm event when the at least one second alarm event is received while the current state of the first alarm event is active or closed; and de-duplicate the at least one second alarm event by merging the at least one second alarm event with the first alarm event based on the event time of the first alarm event and the event time of the at least one second alarm event.

3. The alarm monitoring device as claimed in claim 1, wherein the processor is further configured to merge the at least one second alarm event with the first alarm event based on the retrieved current state of the first alarm event by:

detecting the retrieved current state of the first alarm event as active when the at least one second alarm event is received;

detecting an event time of the at least one second alarm event is prior to an event time of the first alarm event; and de-duplicating the at least one second alarm event by merging the at least one second alarm event with the first alarm event and changing the event time of the first alarm event to the event time of the at least one second alarm event.

4. The alarm monitoring device as claimed in claim 1, wherein the processor is configured to insert the at least one second alarm event separately in the database by:

detecting the retrieved current state of the first alarm event as closed when the at least one second alarm event is received;

detecting an event time of the first alarm event and an event time of the at least one second alarm event when the at least one second alarm event is received while the current state of the first alarm event is closed; and inserting the at least one second alarm event separately in the database based on the event time of the first alarm event and the event time of the at least one second alarm event.

5. A method for alarm monitoring and de-duplicating alarms in a wireless network, wherein the method comprises:

receiving, by an alarm monitoring device, a first alarm event comprising a first alarm configuration from at least one device from a plurality of devices in the wireless network;

receiving, by the alarm monitoring device, at least one second alarm event comprising a second alarm configuration from the at least one device from the plurality of devices;

determining, by the alarm monitoring device, whether the second alarm is associated with the first alarm based on the first alarm configuration and the second alarm configuration;

retrieving, by the alarm monitoring device, a current state of the first alarm event from a database when the second alarm is associated with the first alarm;

determining, by the alarm monitoring device, whether the second alarm is received within a predefined time period based on the retrieved current state of the first alarm event;

based on the at least one second alarm event is being received within the predefined time period, de-duplicating, by the alarm monitoring device, the at least one second alarm event by merging the at least one second alarm event with the first alarm event based on the retrieved current state of the first alarm event, and updating the retrieved current state of the first alarm event as a current state of the at least one second alarm event in the database after merging the at least one second alarm event with the first alarm event; and based on the at least one second alarm event not being received within the predefined time period, inserting, by the alarm monitoring device, the at least one second alarm event separately in the database based on the retrieved current state of the first alarm event and storing the current state of the at least one second alarm event corresponding to the at least one inserted second alarm event in the database, wherein the de-duplicating comprises:

increasing, by the alarm monitoring device, a count of the first alarm after merging the at least one second alarm event with the first alarm event; and storing, by the alarm monitoring device, the count of the first alarm corresponding to the retrieved current state of the first alarm event.

6. The method as claimed in claim 5, wherein the de-duplicating further comprises:

detecting, by the alarm monitoring device, the retrieved current state of the first alarm event as active or closed when the at least one second alarm event is received;

detecting, by the alarm monitoring device, an event time of the first alarm event and an event time of the at least one second alarm event when the at least one second alarm event is received while the current state of the first alarm event is active or closed; and de-duplicating, by the alarm monitoring device, the at least one second alarm event by merging the at least one second alarm event with the first alarm event based on the event time of the first alarm event and the event time of the at least one second alarm event.

7. The method as claimed in claim 5, wherein the de-duplicating further comprises:

detecting, by the alarm monitoring device, the retrieved current state of the first alarm event as active when the at least one second alarm event is received;

detecting, by the alarm monitoring device, an event time of the at least one second alarm event is prior to an event time of the first alarm event; and de-duplicating, by the alarm monitoring device, the at least one second alarm event by merging the at least one second alarm event with the first alarm event and changing the event time of the first alarm event to the event time of the at least one second alarm event.

8. The method as claimed in claim 5, wherein the inserting the at least one second alarm event separately in the database comprises:

detecting, by the alarm monitoring device, the retrieved current state of the first alarm event as closed when the at least one second alarm event is received;

detecting, by the alarm monitoring device, an event time of the first alarm event and an event time of the at least one second alarm event when the at least one second alarm event is received while the current state of the first alarm event is closed; and inserting, by the alarm monitoring device, the at least one second alarm event separately in the database based on the event time of the first alarm event and the event time of the at least one second alarm event.

* * * * *